United States Patent [19]
Eugster

[11] Patent Number: 6,067,894
[45] Date of Patent: May 30, 2000

[54] COFFEE MAKER HAVING A DOSAGE SIGNALING ASSEMBLY

[75] Inventor: Arthur Eugster, Romanshorn, Switzerland

[73] Assignee: Eugster/Frismag AG, Romanshorn, Switzerland

[21] Appl. No.: 09/226,148

[22] Filed: Jan. 7, 1999

[30] Foreign Application Priority Data

Jan. 8, 1998 [DE] Germany ................. 298 00 175 U

[51] Int. Cl.⁷ .................................................. A47J 31/04
[52] U.S. Cl. ................................................. 99/285; 99/280
[58] Field of Search ................. 99/280, 285, 289 R; 426/433

[56] References Cited

U.S. PATENT DOCUMENTS

| | | | |
|---|---|---|---|
| 3,348,468 | 10/1967 | Eisendrath | 99/282 |
| 4,055,114 | 10/1977 | Kats et al. | 99/280 |
| 4,608,916 | 9/1986 | Becker et al. | 99/283 |
| 4,715,245 | 12/1987 | Daloz | 74/522 |

FOREIGN PATENT DOCUMENTS

| | | |
|---|---|---|
| 0 536 714 | 4/1993 | European Pat. Off. |
| 0 811 344 | 12/1997 | European Pat. Off. |
| 26 14 470 | 10/1976 | Germany |
| 26 52 399 | 5/1978 | Germany |
| 297 01 818 U | 6/1997 | Germany |
| 2 140 286 | 11/1984 | United Kingdom |

*Primary Examiner*—Reginald L. Alexander
*Attorney, Agent, or Firm*—Venable; Gabor J. Kelemen

[57] ABSTRACT

A coffee maker includes a reservoir for accommodating a quantity of water to brew a coffee beverage; a filter basket for accommodating ground coffee to be brewed therein; a water quantity sensor for producing a first signal representing the quantity of water in the reservoir; a coffee quantity sensor for producing a second signal representing the quantity of coffee in the filter basket; and a comparator for comparing a ratio between the first and second signals. The comparator has a first input which is connected to the water quantity sensor and to which the signal is applied; and a second input which is connected to the coffee quantity sensor and to which the second signal is applied. A display device is connected to the comparator for being actuated thereby as a function of the ratio between the first and second signals.

18 Claims, 4 Drawing Sheets

COFFEE MAKER HAVING A DOSAGE SIGNALING ASSEMBLY

CROSS REFERENCE TO RELATED APPLICATION

This application claims the priority of German Application No. 298 00 175.6 filed Jan. 8, 1998, which is incorporated herein by reference.

BACKGROUND OF THE INVENTION

This invention relates to a coffee maker which has a dosage signaling assembly and which includes a filter basket accommodating ground coffee as well as a water reservoir communicating with a vapor generator, particularly a flow heater and wherein the vapor generator has a discharge end from which brewing water is introduced into the filter basket.

In known coffee makers of the above-outlined type, particularly in coffee makers for household use, brewing water flows from the water reservoir (which forms part of the coffee maker) through a flow heater for heating the water to the brewing temperature. Subsequently, by means of the vapor pressure generated in the flow heater, the brewing water is guided by a rising conduit to the filter basket which is lined by a filter insert and which accommodates the ground coffee. The brewing water percolating through the ground coffee becomes the coffee beverage which runs into a coffee pot positioned underneath the filter basket. The strength of the brewed coffee beverage is determined as a function of the ratio of the metered ground coffee quantity in the filter basket to the brewing water quantity passing through the ground coffee. To brew coffee according to the desired concentration (strength), conventional water reservoirs have a transparent portion carrying a scale which marks cup quantities to guide the operating person in filling the reservoir with water corresponding to the desired quantity of coffee beverage. As a rule, dosing a ground coffee quantity which is associated with a desired beverage strength is conventionally effected by a measuring spoon whose volume is designed such that it may accommodate a ground coffee quantity which yields a cup of coffee of normal strength. The dosing with such an arrangement, however, is circumstantial because care has to be taken that the measuring spoon is accurately filled and, if required, the dosing has to be repeated several times. It is a further drawback that dosing according to such a conventional procedure is very frequently inaccurate, because often the measuring spoon is charged with too much or too little ground coffee. A desired defined change of the concentration of the coffee beverage is even more difficult to achieve because the measuring spoon has only a single determined capacity.

German Utility Model No. 297 01 818 discloses a digital coffee level indicator which makes unnecessary a measuring spoon count while the filter basket of a household coffee maker is filled with ground coffee. For this purpose a precision weight sensor is provided at a location where the filter basket is suspended. The weight sensor is coupled with a digital indicator to display the weight of ground coffee present in the filter basket. Based on such a digital display, however, the filter basket may be charged with coffee of the desired weight only if the weight/strength relationship is known to the operating person who thus may monitor the coffee weight on the digital display. Thus, the operating person needs to know for all brewing water quantities the associated ground coffee quantities of the desired strength; such information, in all likelihood, needs to be obtained from a graph. It is a further drawback of such a digital display system that it requires attention because, as the displayed value varies, there is no positive "yes" or "no" indication whether excessive or insufficient amounts of ground coffee are displayed.

European Published Patent Application 536 714 discloses an automatic metering device for ground coffee, by means of which the desired concentration of the coffee beverage is obtained automatically. The ground coffee is introduced into a filter basket in a controlled manner by a disk which has compartment-forming vanes and which is situated underneath a ground coffee container. The metering device is driven by a motor unit operated by a control circuit. The control circuit, which is not described in detail, may be programmed according to the desired strength of the coffee beverage. The motor unit then meters, on the one hand, the volume of water which, corresponding to the desired number of cups, is directed to a flow chamber and, on the other hand, rotates the disk to an extent to discharge the ground coffee into the filter basket from a determined number of compartments. This automatic metering device, however, is complicated and expensive.

SUMMARY OF THE INVENTION

It is an object of the invention to provide an improved coffee maker with a dosage signaling assembly, by means of which an exact dosage of the ground coffee quantity is signaled for any desired brewing water quantities in a simple, reliable and well-visible manner. It is a further object to provide a dosage signaling assembly which positively indicates that a ground coffee quantity corresponding to the arbitrarily selected coffee strength has been introduced into the filter basket.

This object and others to become apparent as the specification progresses, are accomplished by the invention, according to which, briefly stated, the coffee maker includes a reservoir for accommodating a quantity of water to brew a coffee beverage; a filter basket for accommodating ground coffee to be brewed therein; a water quantity sensor for producing a first signal representing the quantity of water in the reservoir; a coffee quantity sensor for producing a second signal representing the quantity of coffee in the filter basket; and a comparator for comparing a ratio between the first and second signals. The comparator has a first input connected to the water quantity sensor for receiving the first signal; and a second input connected to the coffee quantity sensor for receiving the second signal. An indicating (display) device is connected to the comparator for being actuated thereby as a function of the ratio between the first and second signals.

The invention is based on the principle that the water quantity sensor and the ground coffee quantity sensor of the dosage signaling device automatically determine the water quantity in the water container and, respectively, the ground coffee quantity in the filter basket, and further, signals representing the two determined quantities are applied to a comparator which, when a desired ratio of the ground coffee quantity to the water quantity is reached, actuates a display device. Upon such actuation the display device automatically switches from a first display condition (for example, an indication of an insufficient ground coffee quantity) to a second display condition which shows that the ground coffee quantity has been reached which is required to obtain the desired strength of the coffee beverage. Such an automatic functioning of the dosage signaling device means for the consumer that he/she needs to observe merely the display device during filling of the ground coffee into the filter basket to stop introduction of the ground coffee into the filter basket when the display device switches over from a first condition to a second condition. The device also operates conversely: If first accidentally excessive ground coffee is introduced into the filter basket, the excess ground coffee is taken from the filter basket until the display device switches from the second condition into the first condition. Thus, by practicing the invention, the introduction of ground coffee may be effected by inexperienced persons without particular care or attention in order to reliably obtain a coffee beverage of the desired strength after the brewing process has taken place.

According to a first preferred embodiment of the invention, the water quantity sensor includes a pressure-responsive diaphragm which is arranged in the bottom region of the water reservoir which, in turn, is fixedly attached to the base frame of the coffee maker. The diaphragm carries a first displaceable component such that the latter follows the excursions of the diaphragm. The ground coffee quantity sensor includes a second displaceable component carried by the filter basket which may be movable against the force of a return spring. The first and second displaceable components are connected to a displacement comparator such that the two components transfer their respective displacements to the comparator. Since the extent of the excursion of the diaphragm represents the weight and thus the quantity of water in the reservoir and the spring-opposed displacement of the coffee basket represents the weight and thus the quantity of ground coffee in the filter basket, the extent of shift of the first and second displaceable components represents, respectively, the water and the ground coffee quantities. The path comparator directly compares the positions of the first and second displaceable components or the paths which they travel from an initial position.

A second preferred embodiment of the invention differs from the first embodiment in that the water reservoir is supported to be movable (slidable or pivotal) relative to the base frame of the coffee maker against the force of a spring and the first displaceable component is attached to the outside of the reservoir. Thus, the second embodiment does not use a pressure-responsive diaphragm and therefore the reservoir bottom does not need a diaphragm-accommodating aperture.

According to an advantageous feature of the invention, which may find application in both the first and the second embodiments, the path comparator is a mechanical device in which the first displaceable component, formed as a stem or pin-like member, engages a first arm of a two-arm lever, whose second arm carries an actuator of the display device. The second displaceable component cooperates with the actuator and contacts (operates) the same when a certain positional relationship between the two-arm lever and the second displaceable component is reached. In this arrangement, the two-arm lever, the display device actuator carried by the two-arm lever and the second displaceable component attached to the filter basket form the comparator.

According to a structurally simple feature of the invention, the actuator carried by the two-arm lever is an on-off switch formed by a pair of leaf spring contacts. When the above-noted positional relationship is reached, the second displaceable component pushes the leaf spring contacts together, thus closing an electric circuit which contains, for example, a signaling lamp. Thus, the contact spring pair is actuated as a function of the position of the second displaceable component (representing the ground coffee quantity) relative to the second lever arm of the two-arm lever, while the position of the two-arm lever depends on the position of the first displaceable component (representing the water quantity). For practically arbitrary water quantities thus the contact spring pair is actuated when the ground coffee quantity introduced into the filter basket is in a determined ratio to the water quantity.

In a third preferred embodiment of the invention the pressure responsive diaphragm of the first embodiment is coupled with a first pressure-transmitting component which, in turn, contacts a first transducer that produces an electric signal representing the water quantity in the reservoir. Further, a second pressure-transmitting component is coupled with the filter basket and contacts a second transducer that produces an electric signal representing the ground coffee quantity in the filter basket. The first and second transducers, which may be strain gauges, are components arranged in branches of a bridge circuit constituting a comparator for comparing the signals produced by the first and second transducers. The zero branch of the bridge circuit contains the display device actuated when the predetermined ratio between the signals is reached. Thus, in the third embodiment electric output signals of the water quantity sensor and the ground coffee quantity sensor are compared in a compact electric comparator which functions in a highly satisfactory manner even without maintenance because it operates without mechanical friction.

A fourth preferred embodiment of the invention differs from the third embodiment in that the water reservoir is designed to be movable similarly to the second embodiment and the first pressure-transmitting component is directly affixed to the outside of the reservoir. In other aspects the fourth embodiment corresponds to the third embodiment.

The filter basket is supported in a simple manner on the base frame of the coffee maker by a suspension lever having one end affixed to the outside of the filter basket and another end pivotally supported on the base frame.

In the first and second embodiments, for setting the concentration of the coffee beverage corresponding to a certain ground coffee quantity in relation to the brewing water quantity, the suspension lever of the filter basket is supported on a settable eccentric disk with the intermediary of a compression spring. By manually turning the eccentric disk, the initial position of the filter basket will be different, thus varying the extent of displacement of the filter basket (caused by the weight of the introduced ground coffee) until the display device switches from a first condition to a second condition.

In the embodiments where the comparator is a bridge circuit, the desired concentration (that is, the desired ratio between the electric signals produced by the first and second transducers to actuate the display device) is set by a rheostat which forms one branch of the bridge circuit.

DESCRIPTION OF THE PREFERRED EMBODIMENTS

It is noted at the outset that conventional coffee maker components which do not have a bearing on the dosage signaling assembly according to the invention, such as a vapor generator, particularly a flow heater coupled by means of a flexible conduit to the water reservoir and to the filter basket, are not described or illustrated.

Figure 1:
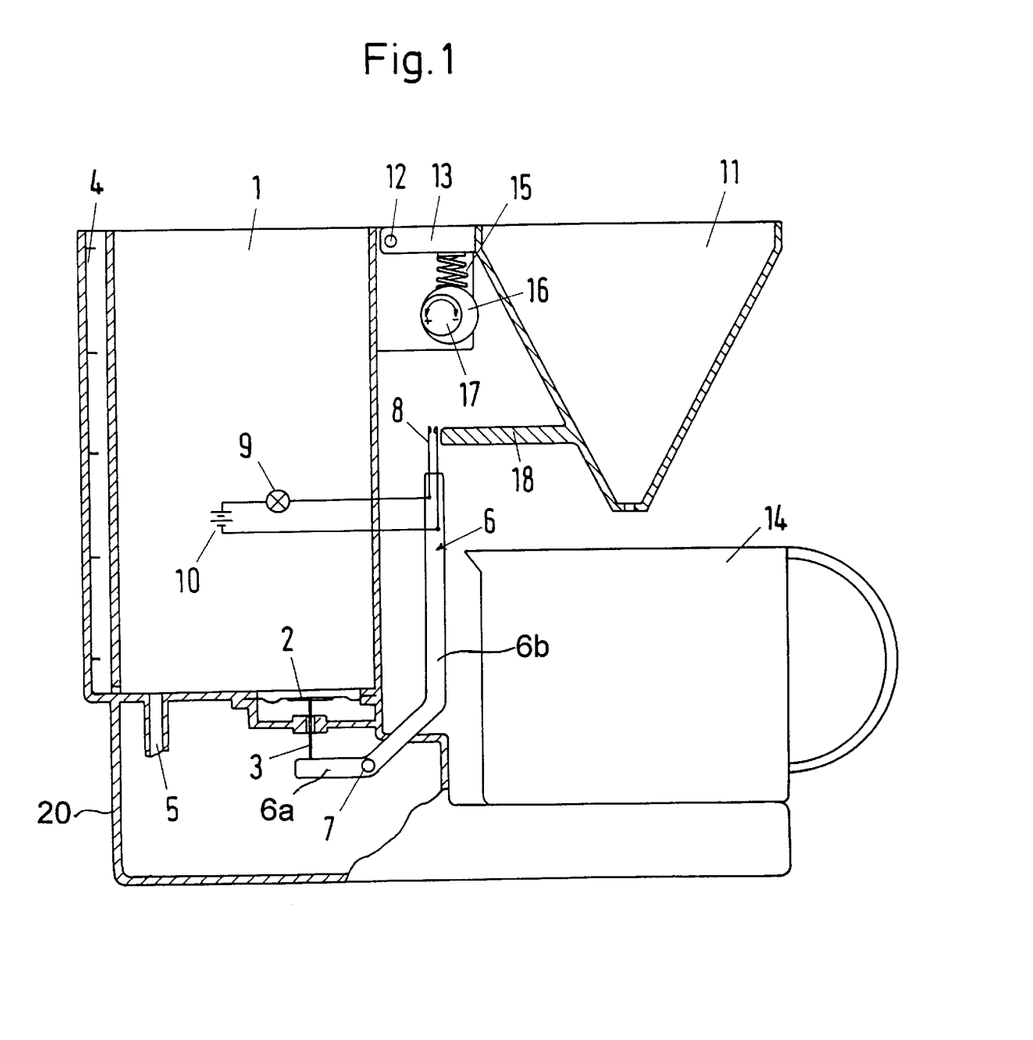
FIG. 1 is a sectional side elevational view of a first preferred embodiment of the invention.

Turning to FIG. 1, a water reservoir 1 fixedly attached to a base frame 20 of the coffee maker, has a bottom, one part of which has a hole sealingly covered by a pressure responsive diaphragm 2. A plunger 3 is attached to, and thus moves in unison with the diaphragm 2. The plunger 3 constitutes a first displaceable component and, together with the diaphragm 2, acts as a water quantity sensor since the downward displacement of the diaphragm 2 is a function of the momentary water quantity accommodated in the reservoir 1.

The water reservoir 1 has a lateral water level indicator 4 which is conventionally marked to indicate the water volume by the number of cups. From the bottom of the water reservoir 1 a water outlet 5 extends which is connected with a non-illustrated vapor generator.

The lower end of the plunger 3 is connected to one arm 6a of a two-arm lever 6 pivotally supported on a pin 7 which, in turn, is held on the base frame 20. The other arm 6b of the lever 6 carries a contact spring pair 8 constituting an on-off switch for a display device formed of an electric circuit which includes a signaling lamp 9 and a current source 10.

The coffee maker further includes a filter basket 11 which has a suspension lever 13 secured to the base frame 20 of the coffee maker by a pin 12 for pivotal motion about a horizontal axis. The suspension lever 13 is supported, at a location spaced from the pin 12, by a compression spring 15 whose lower end is seated on an eccentric disk 16 provided with a rotary adjusting knob 17. By rotating the eccentric disk 16 to a desired extent, the initial position of the filter container 11 may be set since the force of the spring 15, dependent upon the height level of the spring-supporting face of the eccentric disk 16, exerts a greater or lesser force to the suspension lever 13 and thus the position of equilibrium between spring force and weight will result in different angular positions of the filter basket 11. Underneath the filter basket 11 a coffee pot 14 may be positioned to receive the brewed coffee beverage flowing out of an outlet provided in the bottom of the filter basket 11.

To the external face of the filter basket 11 a stem 18 is attached which constitutes a second displaceable component and forming an essential part of a ground coffee quantity sensor, since the position of the stem 18 which moves in unison with the filter basket 11, represents the ground coffee quantity in the filter basket 11.

As it may be observed in FIG. 1, the opening or closing of the switch 8 is a function of the position of the lever 6 and the position of the stem 18. While the position of the lever 6 is a function of the water quantities in the reservoir 1, the position of the stem 18 is a function of the ground coffee quantities in the filter basket 11.

The dosage signaling assembly of FIG. 1 operates as follows:

It is assumed that initially the water reservoir 1 and the filter basket 11 are empty. By means of the knob 17 the initial position of the filter basket 11 is set; the initial angular position of the filter basket 11 and thus the location of the stem 18 determines the desired strength of the coffee beverage, as will be described in further detail below.

First, in a usual manner fresh water is introduced into the water reservoir 1 to a desired quantity of cups as indicated by the water level indicator 4.

As a function of the water quantity in the water reservoir 1, the water pressure on the pressure responsive diaphragm 2 causes a corresponding excursion thereof and thus the plunger 3 is accordingly shifted; such a motion of the plunger 3 is transmitted to the arm 6a of the lever 6. As introduced into the water reservoir 1 until the contact 8, because of the counterclockwise pivotal motion of the lever 6, moves away from the stem 18 and thus assumes its open, circuit-breaking position resulting in a switch-off of the signaling lamp 9.

Dependent on whether stronger or weaker coffee beverage is desired, the eccentric disk 16 is set by the knob 17 such that the filter basket 11 is initially either lowered or raised. If, for example, a relatively low strength of coffee beverage is desired, the knob 17 is rotated clockwise (that is, in the direction of the "minus" arrow), as a result of which the filter basket 11 drops clockwise about the pin 12 and, accordingly, the stem 18 is moved closer to the switch 8. Thus, the positional change of the stem 18, as the filter basket 11 resumes its clockwise movement as ground coffee is introduced thereinto, is relatively small until it actuates the switch 8. Stated differently, a relatively small ground coffee quantity was needed to cause the lamp 9 to light up. Conversely, the ground coffee quantity causing actuation of the display device is larger if the knob 17 was turned counterclockwise (that is, in the direction of the "plus" arrow).

Figure 2:
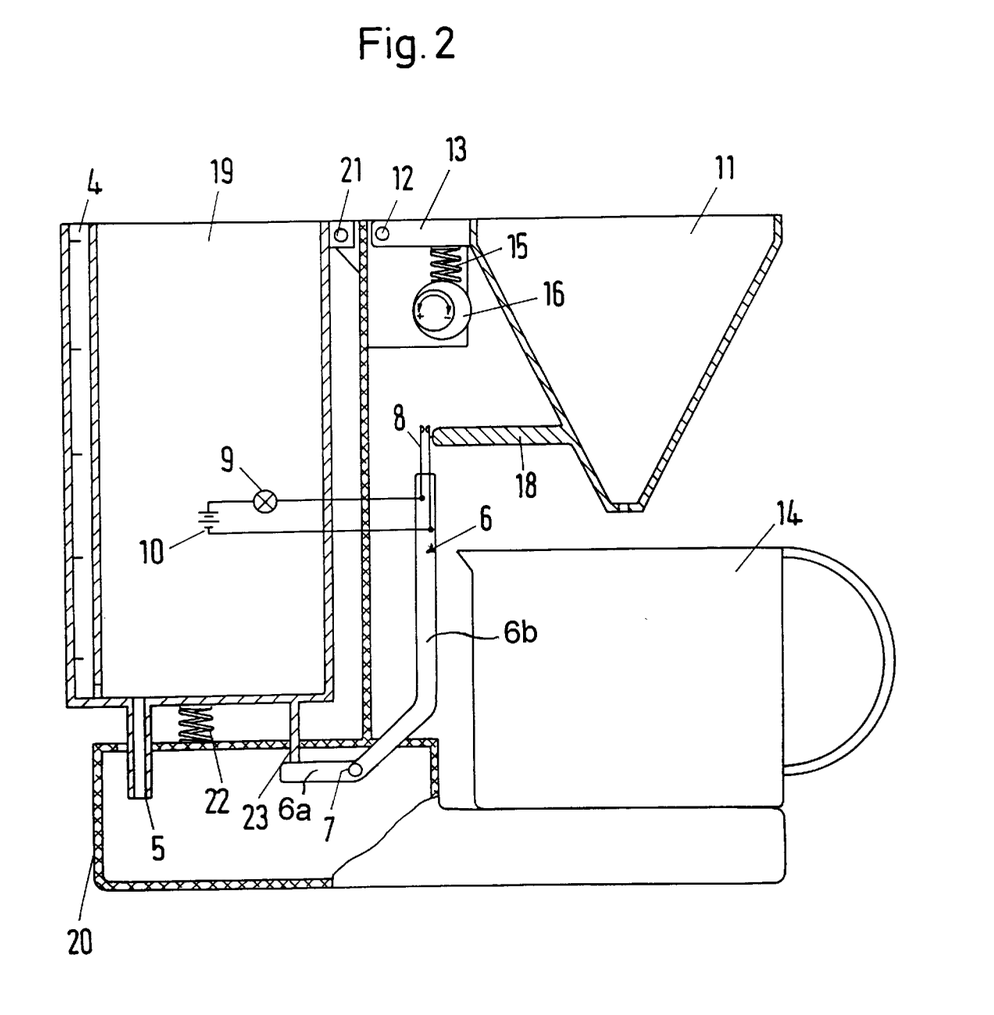
FIG. 2 is a sectional side elevational view of a second preferred embodiment of the invention.

The embodiment illustrated in FIG. 2 differs from the construction shown in FIG. 1 only in that the water reservoir 19 is not a rigid, fixed part of the base frame 20 water is introduced into the reservoir 1, the lever 6 pivots counterclockwise about the pin 7, as a result of which the contact spring pair 8 carried by the arm 6b of the lever 6 is moved away from the stem 18.

As a next step, after a filter paper is positioned in the filter basket 11, the latter is charged with ground coffee; during this step, as the weight of the ground coffee in the filter basket 11 increases, the latter pivots clockwise about the pin 12 against the force of the compression spring 15 and thus the stem 18 approaches the contact pair 8. When eventually the stem 18 pushes the contacts of the contact pair 8 together which closes the circuit and thus the signaling lamp 9 lights up, indicating to the user that the quantity at that moment present in the filter basket 11 is in the desired ratio with the water quantity in the reservoir 1 to obtain a coffee beverage of the desired strength. Thereafter, the brewing operation may be performed in the usual, conventional manner.

It is also feasible to proceed in a reverse order if, for example, a relatively small quantity of ground coffee is available. In such a case, first such a coffee quantity is introduced into the filter basket 11 at a time when the water reservoir 1 is still empty. As a result, the contact 8 immediately closes and the signaling lamp 9 lights up. Then, to be able to brew coffee to the desired strength, water is of the coffee maker, but is movable about a pivot 21 attached to the base frame 20 and is supported thereon by a compression spring 22. A stem 23 is affixed to the exterior underside of the base of the water reservoir 19 and engages, as does the stem (plunger) 3 of the FIG. 1 embodiment, the arm 6a of the two-arm lever 6. Thus, the embodiment according to FIG. 2 dispenses with a pressure responsive diaphragm, the required aperture in the reservoir bottom to accommodate the diaphragm, as well as the structural details required to guide the plunger 3 of the FIG. 1 embodiment. The more robust structure of the FIG. 2 embodiment is, however, at the expense of a more precise water quantity detection of the FIG. 1 embodiment in which the excursion of the plunger 3 is a function solely of the water quantity, whereas in the FIG. 2 embodiment the excursion of the stem 23 starts its motion from an initial position which also depends from the weight (mass) of the water reservoir 19 and any component attached thereto.

It is an important feature of the invention that the correct ratio of the brewing water to the ground coffee is signaled not only for one certain water quantity or, as the case may be, one certain ground coffee quantity but—as permitted by the capacity of the water reservoir—for desired water quantities for which, dependent on the desired strength of the coffee beverage, the correct coffee quantity may be assigned and conversely. For this purpose, the contact spring pair 8 is actuated not only in a certain position of the lever 6 but also when the position of the lever 6 and the position of the stem 18 are in such a relationship to one another that the contact spring pair 8 is actuated. Such an actuation may occur over a large displacement path of the lever 6.

Figure 3:
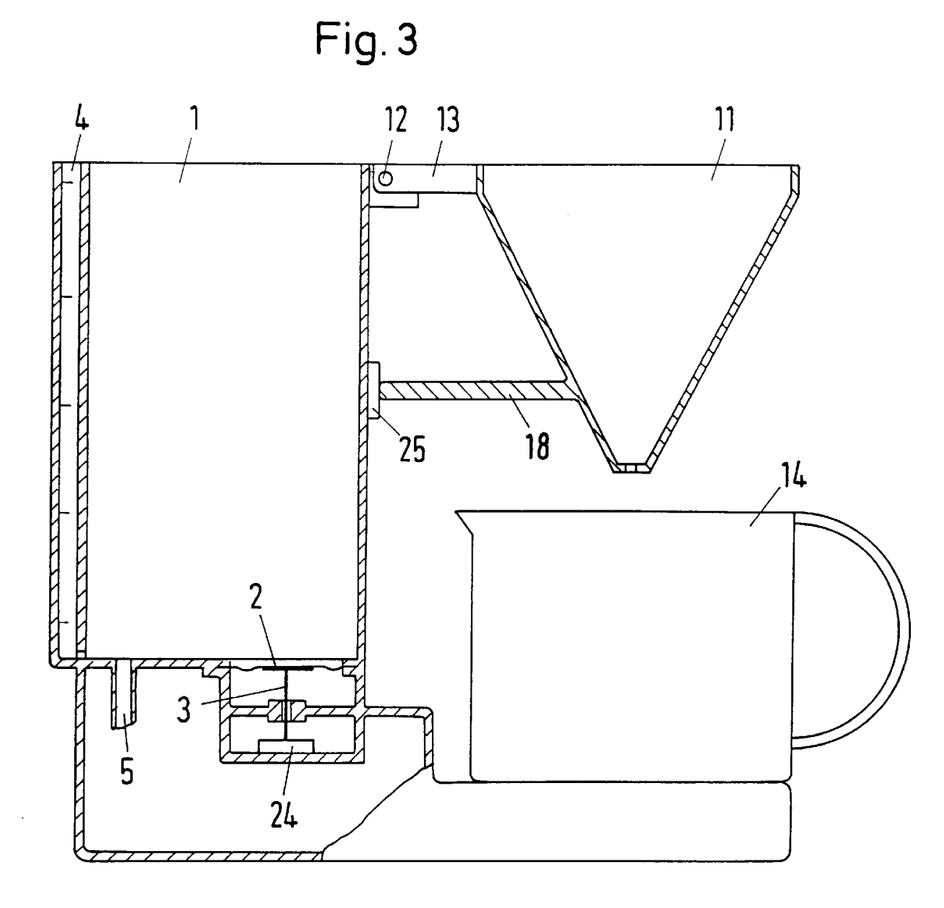
FIG. 3 is a sectional side elevational view of a third preferred embodiment of the invention.
Figure 4:
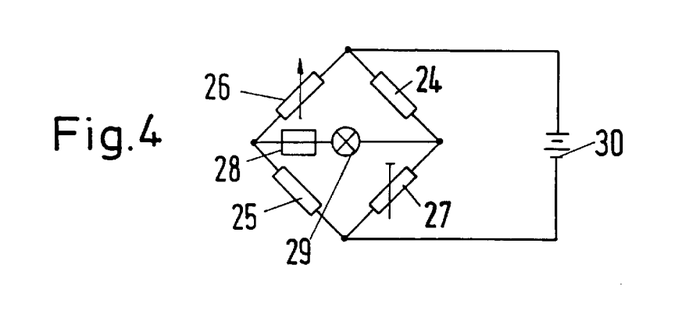
FIG. 4 is a circuit diagram forming part of the third embodiment.
Figure 5:
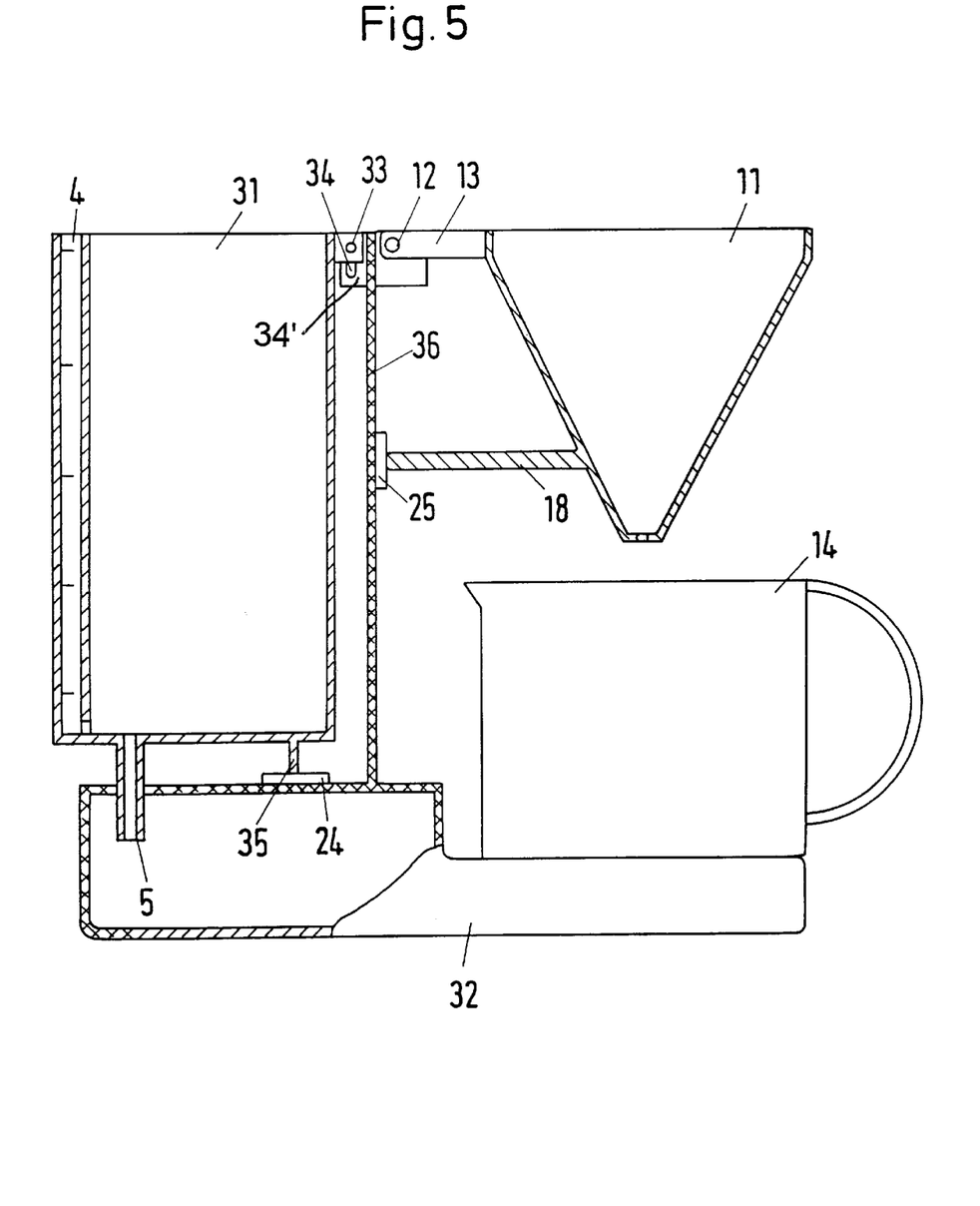
FIG. 5 is a sectional side elevational view of a fourth preferred embodiment of the invention.

While the embodiments of FIGS. 1 and 2 perform a displacement comparison, in the embodiments now to be described in conjunction with FIGS. 3, 4 and 5, a comparison of electric signals representing pressures is effected. The pressures, in turn, represent water and ground coffee quantities.

Turning to FIG. 3, similarly to FIG. 1, the water reservoir 1 which is fixedly attached to the base frame of the coffee maker, has a bottom, one portion of which is formed by a pressure-responsive diaphragm 2. The plunger 3 attached to the diaphragm 2 contacts a first transducer 24 which may be a strip-like strain gauge and which forms one branch of a Wheatstone bridge circuit illustrated in FIG. 4. Similarly, the stem 18 attached to the filter basket 11 is in engagement with a second transducer 25 which likewise may be a strip-like strain gauge and which forms another branch of the bridge circuit. Thus, the transducer 24 produces a signal (that is, it changes its electric resistance) which represents the pressure exerted thereon by the plunger 3 (thus constituting a first pressure-exerting component) and eventually represents the water quantities in the reservoir 1. The transducer 25 produces an electric signal (that is, it changes its electric resistance) which represents the pressure exerted thereon by the stem 18 (thus constituting a second pressure-exerting component) and eventually represents the ground coffee quantities in the filter basket 11. The filter basket 11, similarly to the constructions shown in FIGS. 1 and 2, is suspended by an arm 13 on a pin 12 and is pivotal about a horizontal axis.

With further reference to FIG. 4, the Wheatstone bridge also includes a rheostat 26 as well as a compensating resistor 27 forming third and fourth branches, in addition to the first and second branches formed by the respective transducers 24 and 25. The bridge circuit has a zero branch in which a flip-flop member 28 and a signaling lamp 29 (electro-optical display device) are serially connected. The bridge circuit is supplied with energy from a current source 30.

By means of the rheostat 26 the desired ratio between the brewing water quantity and the ground coffee quantity may be set to obtain a coffee beverage of the desired strength. The compensating resistor 27 serves for compensating the bridge to obtain a desired basic setting and to compensate for tolerances in the weight of structural elements.

Upon filling the reservoir 1 with water to the desired level, the bridge circuit is out of balance to a greater or lesser extent since the resistance of the transducer 24 adjusts itself according to the water quantity represented by the pressure exerted on the transducer 24 by pressure-transmitting component (plunger) 3 attached to the pressure-responsive diaphragm 2. Thereafter, a ground coffee quantity is introduced into the filter basket 11 until the resistance of the second transducer 25, by virtue of the pressure exerted thereon by the pressure-transmitting component 18 attached to the filter basket 11, adjusts itself to such a magnitude that the voltage across the zero branch of the bridge circuit (in which the flip-flop element 28 and the signaling lamp 29 are serially connected) reaches a predetermined value in which the flip-flop element is set and, as a result, the lamp 25 lights up. As noted earlier, such a set point of the flip-flop element 28 and thus the actuation of the lamp 29 may be preset by adjusting the rheostat 26 in accordance with the desired strength of the coffee beverage.

The basic advantages of a precise dosing possibility of the ground coffee quantities which are independent from the brewing water quantities are thus obtained with the embodiment shown in FIGS. 3 and 4 with less movable parts than those present in the embodiments according to FIGS. 1 and 2. Thus the wear is less and the need for maintenance is reduced. It is to be noted that care has to be taken to ensure that the bridge circuit of FIG. 4 operates during a long service life with the required properties such as, for example, an independence from temperature effects.

Turning to FIG. 5, the embodiment illustrated therein differs from the FIG. 3 embodiment only in that the water reservoir 31 is not attached fixedly to the base frame of the coffee maker but is displaceable in a vertical direction. A pressure-transmitting component 35 is attached externally to the underside of the water reservoir 31 and is in a pressure transferring relationship with the pressure-responsive transducer 24. Thus, similarly to the FIG. 2 embodiment, the construction shown in FIG. 5 does not use a pressure-responsive diaphragm as part of the reservoir bottom. For movably supporting the water reservoir 31, a sliding pin 33 carried by the reservoir 31 is received in a vertically extending slot 34 provided in a support plate 34' affixed to the base frame of the coffee maker by means of a carrier 36. The carrier 36 further supports the horizontal pin 12 about which the filter basket 11 is pivotal, similarly to the arrangement illustrated in FIG. 2. The coffee quantity sensor formed of the pressure-transmitting component 18 and the pressure-responsive transducer element 25 is identical to that illustrated in FIG. 3. Signal comparison and an arbitrary setting of the desired strength of the coffee beverage are performed by electrical means in a manner identical to the FIG. 4 arrangement.

It will be understood that the above description of the present invention is susceptible to various modifications, changes and adaptations, and the same are intended to be comprehended within the meaning and range of equivalents of the appended claims.

What is claimed is:

1. A coffee maker comprising
   (a) a reservoir for accommodating a quantity of water to brew a coffee beverage;
   (b) a filter basket for accommodating ground coffee to be brewed therein;
   (c) a water quantity sensor for producing a first signal representing the quantity of water in said reservoir; said water quantity sensor comprising a first pressure-transmitting component operatively connected to said reservoir; a first transducer connected to said first pressure-transmitting component for producing a first electric signal representing a pressure applied to said first pressure-transmitting component by said reservoir as a function of a quantity of water therein;

(d) a coffee quantity sensor for producing a second signal representing the quantity of coffee in said filter basket; said coffee quantity sensor comprising a second pressure-transmitting component operatively connected to said filter basket; a second transducer connected to said second pressure-transmitting component for producing a second electric signal representing a pressure applied to said second pressure-transmitting component by said filter basket as a function of a quantity of coffee therein;

(e) a comparator for comparing a ratio between said first and second signals; said comparator comprising a bridge circuit having
(1) a first branch including said first pressure-transmitting component;
(2) a second branch including said second pressure-transmitting component; and
(3) a zero branch; and (f) a display device connected to said comparator for being actuated thereby as a function of the ratio between said first and second signals; said zero branch of said bridge circuit including said display device.

2. The coffee maker as defined in claim 1, further comprising a setting device for preselecting a desired ratio between the water quantity in said reservoir and the coffee quantity in said filter basket; said display device being actuated when the preselected desired ratio is reached; wherein said bridge circuit comprises a third branch including a rheostat; said rheostat forming said setting device.

3. The coffee maker as defined in claim 1, wherein said first and second transducers comprise respective strain gauges.

4. The coffee maker as defined in claim 1, wherein said first and second transducers are capacitive transducers.

5. The coffee maker as defined in claim 1, wherein said first and second transducers are inductive transducers.

6. The coffee maker as defined in claim 1, wherein said first and second electric signals are electric resistances of said first and second transducers, respectively.

7. The coffee maker as defined in claim 1, further comprising a base frame; said reservoir being rigidly affixed to said base frame; said reservoir having a bottom provided with a hole sealingly covered by a pressure responsive diaphragm executing excursions as a function of water quantities in said reservoir; said first pressure-transmitting component being attached to said diaphragm.

8. The coffee maker as defined in claim 1, further comprising a base frame; support means for movably supporting said reservoir on said base frame for allowing displacements of said reservoir relative to said base frame as a function of water quantities in said reservoir; said support means including a return spring opposing displacements of said reservoir in response to water quantities therein; said first pressure-transmitting component being attached to said reservoir externally thereof.

9. A coffee maker comprising
(a) a reservoir for accommodating a quantity of water to brew a coffee beverage;
(b) a filter basket for accommodating ground coffee to be brewed therein;
(c) a water quantity sensor for producing a first signal representing the quantity of water in said reservoir; said water quantity sensor including a first displaceable component operatively connected to said reservoir; an extent of displacement of said first displaceable component representing a water quantity present in said reservoir;
(d) a coffee quantity sensor for producing a second signal representing the quantity of coffee in said filter basket; said coffee quantity sensor comprising a second displaceable component operatively connected to said filter basket; an extent of displacement of said second displaceable component representing a coffee quantity present in said filter basket;
(e) a comparator for comparing a ratio between said first and second signals; said comparator having
(1) a first input connected to said water quantity sensor for receiving said first signal; and
(2) a second input connected to said coffee quantity sensor for receiving said second signal;
(f) a display device connected to said comparator for being actuated thereby as a function of the ratio between said first and second signals;
(g) a base frame; and
(h) support means for movably supporting said filter basket on said base frame for allowing displacements of said filter basket relative to said base frame as a function of coffee quantities in said filter basket; said support means including a return spring opposing displacements of said filter basket in response to coffee quantities therein; said second displaceable component being attached to said filter basket externally thereof.

10. The coffee maker as defined in claim 9, said support means comprising a suspension lever affixed to said filter basket and pivotally mounted on said base frame to allow a pivotal movement of said filter basket about a horizontal axis; said return spring being connected to said suspension arm.

11. The coffee maker as defined in claim 9, further comprising a setting device for preselecting a desired ratio between the water quantity in said reservoir and the coffee quantity in said filter basket; said display device being actuated when the preselected desired ratio is reached; wherein said setting device comprises means for arbitrarily changing a force of said return spring for setting an initial position of said filter basket.

12. The coffee maker as defined in claim 11, wherein said means for arbitrarily changing a force comprises an adjustable eccentric disk having a periphery supporting said return spring.

13. A coffee maker comprising
(a) a reservoir for accommodating a quantity of water to brew a coffee beverage;
(b) a filter basket for accommodating ground coffee to be brewed therein;
(c) a water quantity sensor for producing a first signal representing the quantity of water in said reservoir; said water quantity sensor including a first displaceable component operatively connected to said reservoir; an extent of displacement of said first displaceable component representing a water quantity present in said reservoir;
(d) a coffee quantity sensor for producing a second signal representing the quantity of coffee in said filter basket; said coffee quantity sensor comprising a second displaceable component operatively connected to said filter basket; an extent of displacement of said second displaceable component representing a coffee quantity present in said filter basket;

(e) a displacement comparator having a pivotally supported lever; said first and second displaceable components being in a displacement-transmitting relationship with said displacement comparator; said first displaceable component engaging said lever for pivoting said lever as a function of displacements of said first displaceable component; and (f) a display device connected to said comparator for being actuated thereby; said display device comprising an on-off switch forming part of said displacement comparator, and said second displaceable component cooperating with said on-off switch for operating said on-off switch as a function of the positions of said lever and said second displaceable component.

14. The coffee maker as defined in claim 13, further comprising a setting device for preselecting a desired ratio between the water quantity in said reservoir and the coffee quantity in said filter basket; said display device being actuated when the preselected desired ratio is reached.

15. A coffee maker comprising (a) a reservoir for accommodating a quantity of water to brew a coffee beverage;

(b) a filter basket for accommodating ground coffee to be brewed therein;

(c) a water quantity sensor for producing a first signal representing the quantity of water in said reservoir;

(d) a coffee quantity sensor for producing a second signal representing the quantity of coffee in said filter basket;

(e) a comparator for comparing a ratio between said first and second signals; said comparator having
   (1) a first input connected to said water quantity sensor for receiving said first signal; and
   (2) a second input connected to said coffee quantity sensor for receiving said second signal; and (f) a display device connected to said comparator for being actuated thereby as a function of the ratio between said first and second signals; said display device including one of an electro-optical indicator and an acoustic indicator.

16. A coffee maker comprising (a) a reservoir for accommodating a quantity of water to brew a coffee beverage;

(b) a filter basket for accommodating ground coffee to be brewed therein;

(c) a water quantity sensor for producing a first signal representing the quantity of water in said reservoir; said water quantity sensor including a first displaceable component operatively connected to said reservoir; an extent of displacement of said first displaceable component representing a water quantity present in said reservoir;

(d) a coffee quantity sensor for producing a second signal representing the quantity of coffee in said filter basket; said coffee quantity sensor comprising a second displaceable component operatively connected to said filter basket; an extent of displacement of said second displaceable component representing a coffee quantity present in said filter basket;

(e) a comparator for comparing a ratio between said first and second signals; said comparator having
   (1) a first input connected to said water quantity sensor for receiving said first signal; and
   (2) a second input connected to said coffee quantity sensor for receiving said second signal;

(f) a display device connected to said comparator for being actuated thereby as a function of the ratio between said first and second signals; and (g) a base frame; said reservoir being rigidly affixed to said base frame; said reservoir having a bottom provided with a hole sealingly covered by a pressure responsive diaphragm executing excursions as a function of water quantities in said reservoir; said first displaceable component being attached to said diaphragm for displacement therewith.

17. A coffee maker comprising (a) a reservoir for accommodating a quantity of water to brew a coffee beverage;

(b) a filter basket for accommodating ground coffee to be brewed therein;

(c) a water quantity sensor for producing a first signal representing the quantity of water in said reservoir; said water quantity sensor including a first displaceable component operatively connected to said reservoir; an extent of displacement of said first displaceable component representing a water quantity present in said reservoir;

(d) a coffee quantity sensor for producing a second signal representing the quantity of coffee in said filter basket; said coffee quantity sensor comprising a second displaceable component operatively connected to said filter basket; an extent of displacement of said second displaceable component representing a coffee quantity present in said filter basket;

(e) a comparator for comparing a ratio between said first and second signals; said comparator having
   (1) a first input connected to said water quantity sensor for receiving said first signal; and
   (2) a second input connected to said coffee quantity sensor for receiving said second signal;

(f) a display device connected to said comparator for being actuated thereby as a function of the ratio between said first and second signals;

(g) a base frame; and (h) support means for movably supporting said reservoir on said base frame for allowing displacements of said reservoir relative to said base frame as a function of water quantities in said reservoir; said support means including a return spring opposing displacements of said reservoir in response to water quantities therein; said first displaceable component being attached to said reservoir externally thereof.

18. A coffee maker comprising (a) a reservoir for accommodating a quantity of water to brew a coffee beverage;

(b) a filter basket for accommodating ground coffee to be brewed therein;

(c) a water quantity sensor for producing a first signal representing the quantity of water in said reservoir; said water quantity sensor comprising a first displaceable component operatively connected to said reservoir; an extent of displacement of said first displaceable component representing said first signal;

(d) a coffee quantity sensor for producing a second signal representing the quantity of coffee in said filter basket; said coffee quantity sensor comprising a second displaceable component operatively connected to said filter basket; an extent of displacement of said second displaceable component representing said second signal;

(e) a comparator for comparing a ratio between said first and second signals; said comparator having
  (1) a first input connected to said water quantity sensor for receiving said first signal; and
  (2) a second input connected to said coffee quantity sensor for receiving said second signal; and (f) a display device connected to said comparator for being actuated thereby as a function of the ratio between said first and second signals.

* * * * *